Patented May 10, 1938

2,116,978

UNITED STATES PATENT OFFICE

2,116,978

VULCANIZATION OF RUBBER

Ludwig Meuser, Naugatuck, Conn., assignor, by mesne assignments, to United States Rubber Company, New York, N. Y., a corporation of New Jersey No Drawing. Application July 14, 1934, Serial No. 735,199

6 Claims. (Cl. 18—53)

This invention relates to the treatment of rubber, and similar vulcanizable materials and more particularly to the employment in a vulcanization process of the product of reaction of arylene thiazyl sulphides, such as mercaptoarylene thiazoles or their alkaline salts, with a furoyl halide.

The reaction products constitute new types of so-called delayed action accelerators. These new accelerators may be used alone as a vulcanization accelerator, or in conjunction with an amine type of activator which term broadly includes amides and imides and organic acid salts of the amines. Examples of such activators are given by U. S. P. 1,732,486, U. S. P. 1,893,846, U. S. P. 1,950,067, U. S. P. 1,904,573. Activators such as the substituted ammonias containing acyl groups, and the salts of diphenylguanidine (D. P. G.) and an organic carboxylic acid, have acyl components exercising desirable vulcanization retarding influences at lower temperatures at the same time that they have the desirable characteristics of the amine component in promoting quicker acceleration or optimum cures in a shorter time at higher vulcanizing temperatures, when used in conjunction with the new delayed action accelerators. It has also been found that the amount of the new accelerators can be markedly reduced when used in conjunction with amine activators without sacrificing desirable physical and commercial characteristics of the final rubber products. Accordingly mixtures of the new accelerator and an amine type of activator form valuable accelerator combinations.

The invention will be more fully understood from the following description and examples.

*Example 1.*—84 grams of mercaptobenzothiazole are dissolved in 190 grams of about a 10.5% caustic soda solution by gentle heat thereby forming sodium mercaptobenzothiazole. Instead of sodium hydroxide, to dissolve the mercaptobenzothiazole and form an alkaline salt thereof, potassium hydroxide may be used, in which case potassium mercaptobenzothiazole would be formed. The solution is filtered and 66.5 grams of furoyl chloride is added thereto with gentle warming. The cream colored precipitate or reaction product formed is filtered off after allowing the reaction mix to stand about an hour. The reaction product is washed free of sodium chloride and dried. The yield is about 125 grams or approximately 95.6% based on the mercaptobenzothiazole used. Melting point of the product is about 134–136° C. and would vary slightly with further purification. The product has a sulphur content of about 25.2% and a total nitrogen content of about 5.5%

By the above reaction a furoyl group replaces the sodium of the sodium salt of mercaptobenzothiazole and the product may be called the furoyl ester of mercaptobenzothiazole, or furoyl benzothiazyl sulphide. It is believed it has the probable formula

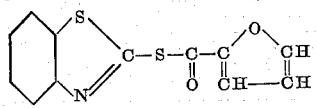

Instead of the chloride, the bromide or iodide may be used, although the former is preferred.

A rubber stock was prepared in the usual manner comprising by weight

| | Parts |
|---|---|
| Smoked sheet rubber | 100 |
| Carbon black | 42 |
| Zinc oxide | 10 |
| Pine tar | 4.15 |
| Palm oil | .85 |
| Zinc soap of cocoanut oil acids | 2.40 |
| Sulphur | 3.25 |
| Furoyl benzothiazylsulphide | .875 | and tensiled at various intervals indicated in minutes cure, at 5 pounds per sq. in. steam pressure for evaluation of scorching properties, and also at 30 pounds per sq. in. steam pressure. Results are given in Table I.

TABLE I

*Scorch test*

| Cure | Tensile at break in lbs./sq. in. | Percent elogation at break |
|---|---|---|
| 105′/5#  | No cure | |
| 120′/5#  | No cure | |
| 135′/5#  | No cure | |
| 150′/5#  | No cure | |
| 165′/5#  | 970 | 675 |

*Unaged tensiles*

| Cure | Tensile at break in lbs./sq. in. | Percent elogation at break |
|---|---|---|
| 20′/30# | 1730 | 620 |
| 30′/30# | 2010 | 610 |
| 40′/30# | 2810 | 650 |
| 50′/30# | 3330 | 676 |
| 60′/30# | 3380 | 656 |
| 75′/30# | 3640 | 650 |
| 90′/30# | 3640 | 633 |

Corresponding tests were made on a "shoe upper" stock comprising by weight:

| | Parts |
|---|---|
| Smoked sheet rubber | 100 |
| Whiting | 47 |
| Zinc oxide | 6 |
| Sulphur | 2 |
| Furoyl benzo thiazyl sulphide | 0.35 | and using therewith in one case A, as activator, e. g. diphenylguanidine-phthalate 0.85 part, and in another case B, e. g. diphenylguanidine-acetate 0.74 part. Results are given in Table II.

TABLE II

*Scorch test*

| Cure | Stock | Tensiles at break in lbs./sq. in. | Percent elongation at break |
|---|---|---|---|
| 20'/5# | A | No cure | |
| 30'/5# | A | No cure | |
| 40'/5# | A | No cure | |
| 50'/5# | A | No cure | |
| 60'/5# | A | No cure | |
| 75'/5# | A | No cure | |
| 90'/5# | A | 1530 | 793 |
| 20'/5# | B | No cure | |
| 30'/5# | B | 1572 | 830 |
| 40'/5# | B | 2353 | 816 |
| 50'/5# | B | 2880 | 786 |
| 60'/5# | B | 2915 | 752 |
| 75'/5# | B | 3107 | 747 |
| 90'/5# | B | 3243 | 756 |

*Unaged tensiles*

| Cure | Stock | Tensiles at break in lbs./sq. in. | Percent elongation at break |
|---|---|---|---|
| 10'/40# | A | 3120 | 770 |
| 20'/40# | A | 3240 | 733 |
| 30'/40# | A | 3460 | 746 |
| 45'/40# | A | 3460 | 770 |
| 60'/40# | A | 3100 | 720 |
| 10'/40# | B | 3540 | 736 |
| 20'/40# | B | 4030 | 720 |
| 30'/40# | B | 3660 | 720 |
| 45'/40# | B | 3540 | 756 |
| 60'/40# | B | 3240 | 713 |

Diphenylguanidine-formate in place of diphenylguanidine-acetate also gave good results, with no curing noted until the 40 minute period in scorch test.

In another example a white proofing compound containing by weight

| | Parts |
|---|---|
| Pale crepe | 100 |
| Sulphur | 3 |
| Zinc oxide | 6 |
| Whiting | 47 |
| Titanium oxide | 20 | was used as the basic stock. Tensile and scorch data on this stock after admixture with various accelerator combinations are indicated in Table III below.

The various stocks are indicated as C, D, E, F and G along with the parts by weight, based on 100 parts by weight of rubber, of the accelerator, or accelerator and activator, used. Ureka C (believed to be benzoyl benzo thiazyl sulphide) is a representative commercial delayed action accelerator.

TABLE III

*Unaged tensiles*

| Cure | C | | D | | E | |
|---|---|---|---|---|---|---|
| | Ureka C .35 DPG-phthalate .80 | | Furoyl-mercaptobenzo thiazole .35 | | Furoyl-mercaptobenzo thiazole .35 DPG-fuorate .88 | |
| | T | E | T | E | T | E |
| 7' @ 40# | 2380 | 720 | 440 | 866 | 2370 | 770 |
| 22' @ 40# | 2980 | 703 | 1380 | 810 | 2820 | 720 |
| 30' @ 40# | 2960 | 706 | 1540 | 823 | 2660 | 703 |

*Scorch test*

| | C | | D | | E | |
|---|---|---|---|---|---|---|
| 10' @ 5# | No cure | | No cure | | No cure | |
| 20' @ 5# | 291 | 922 | No cure | | 354 | 930 |
| 30' @ 5# | 1367 | 820 | No cure | | 1256 | 830 |
| 45' @ 5# | 2335 | 760 | 101 | 972 | 2137 | 712 |
| 60' @ 5# | 2580 | 725 | 203 | 922 | 2530 | 747 |
| 75' @ 5# | 2962 | 747 | 663 | 850 | 2715 | 736 |

*Unaged tensiles (cont'd)*

| Cure | F | | G | |
|---|---|---|---|---|
| | Furoyl-mercaptobenzo thiazole .35 DPG-tartrate .78 | | Furoyl-mercaptobenzo thiazole .35 DPG-acid tartrate .985 | |
| | T | E | T | E |
| 7' @ 40# | 2740 | 783 | 2400 | 770 |
| 22' @ 40# | 2920 | 700 | 2820 | 723 |
| 30' @ 40# | 3000 | 700 | 2840 | 720 |

*Scorch test (cont'd)*

| | F | | G | |
|---|---|---|---|---|
| 10' @ 5# | No cure | | No cure | |
| 20' @ 5# | 975 | | 905 | |
| 30' @ 5# | 1695 | 807 | No cure | |
| 45' @ 5# | 2625 | 775 | 306 | 767 |
| 60' @ 5# | 2862 | 767 | 812 | 750 |
| 75' @ 5# | 3010 | 752 | 1647 | 757 |
| | | | 2272 | 737 |

It will be observed that stock E compares favorably with stock C and that stock G is markedly superior in freedom from scorch with practically no retardation in the rate of cure.

Other advantages of the furoyl derivative of mercaptobenzothiazole are that it is substantially non-discoloring and can be used in mold and air cured goods including footwear, proofing, mechanicals, and the like.

Instead of employing the furoyl derivative of mercaptoarylthiazoles, the substituted furoyl derivative of mercaptoarylthiazoles may be used wherein the furoyl group contains one or more alkyl or substituted alkyl constituents, e. g. methyl, ethyl, etc. Instead of mercaptobenzothiazoles other mercaptoarylthiazoles may be used wherein the aryl radical is substituted by one or more ethyl, methyl or other alkyl radicals.

The examples given are to be understood as illustrative only and not limitative of the invention and it is to be understood that various modifications will suggest themselves,—for instance the use of other proportions and the use of various compounding ingredients including antiagers, softeners, etc. in conjunction with the accelerator products,—all without departing from the spirit of the invention.

The term "rubber" is to be considered broadly as including caoutchouc and similar vulcanizable materials such as gutta percha and balata etc.

Having thus described my invention, what I claim and desire to protect by Letters Patent is:

1. A process which comprises adding to rubber, a vulcanizing agent and a furoyl derivative of a mercapto-aryl-thiazole having the thiol sulphur atom directly linked to a furoyl group, and vulcanizing the rubber.

2. A process of producing a vulcanized rubber product which comprises adding to rubber prior to actual vulcanization a furoyl arylene thiazyl sulphide corresponding to the formula

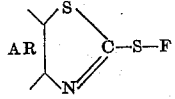

where AR represents an arylene group, and F represents a furoyl group.

3. A product suitable for accelerating the vulcanization of rubber, comprising a furoyl derivative of a mercaptoarylene-thiazole having the thiol sulphur atom directly linked to a furoyl group.

4. As a new product, suitable for accelerating the vulcanization of rubber, a furoyl derivative of mercapto-benzo-thiazole having the thiol sulphur atom directly linked to a furoyl group, and having a melting point of about 134–136° C.

5. A process of treating rubber which comprises subjecting it to vulcanization in the presence of furoyl benzothiazyl sulphide.

6. A rubber product which has been vulcanized in the presence of furoyl benzothiazyl sulphide.

LUDWIG MEUSER.